United States Patent Office 2,769,353
Patented Nov. 6, 1956

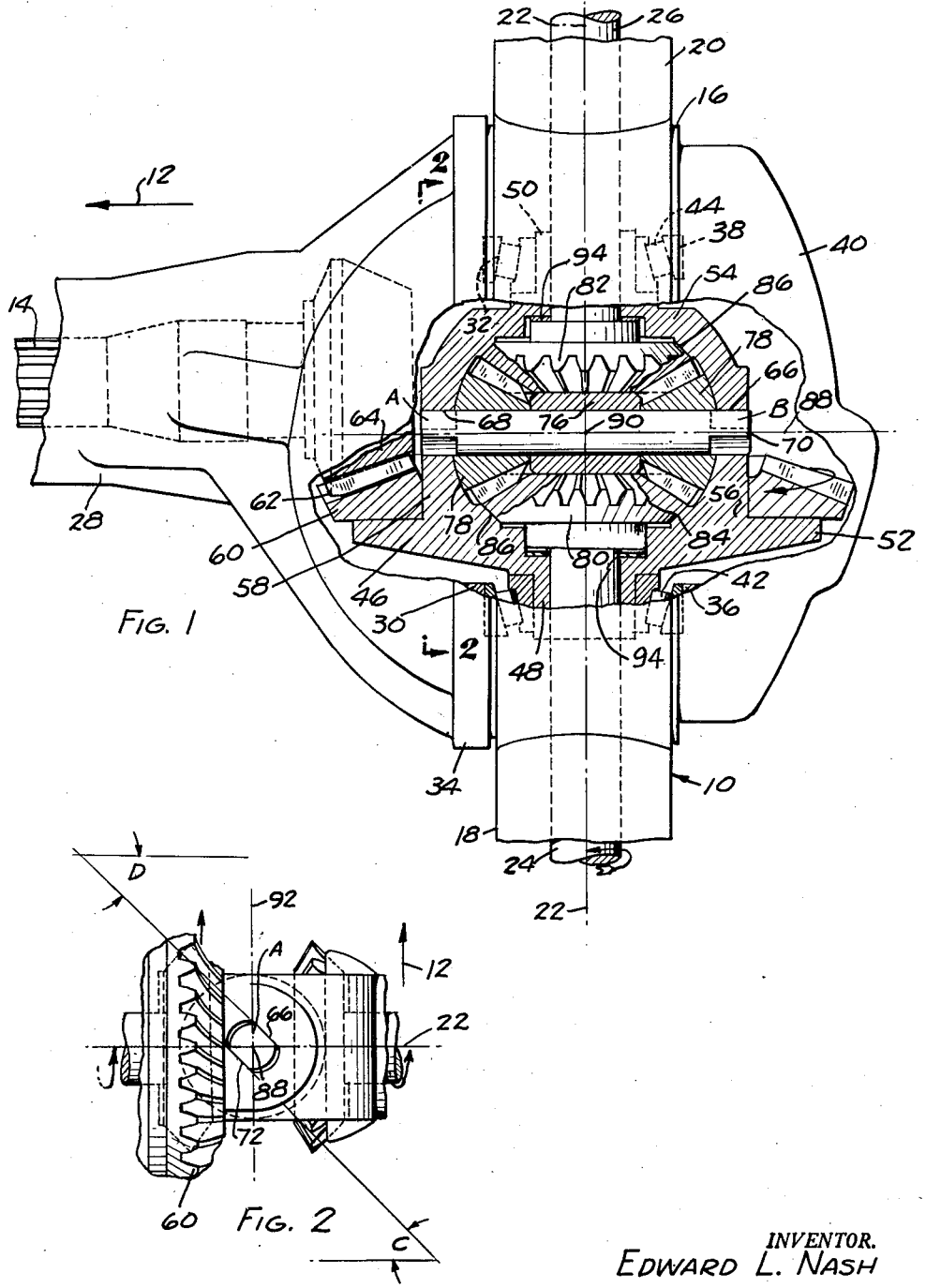

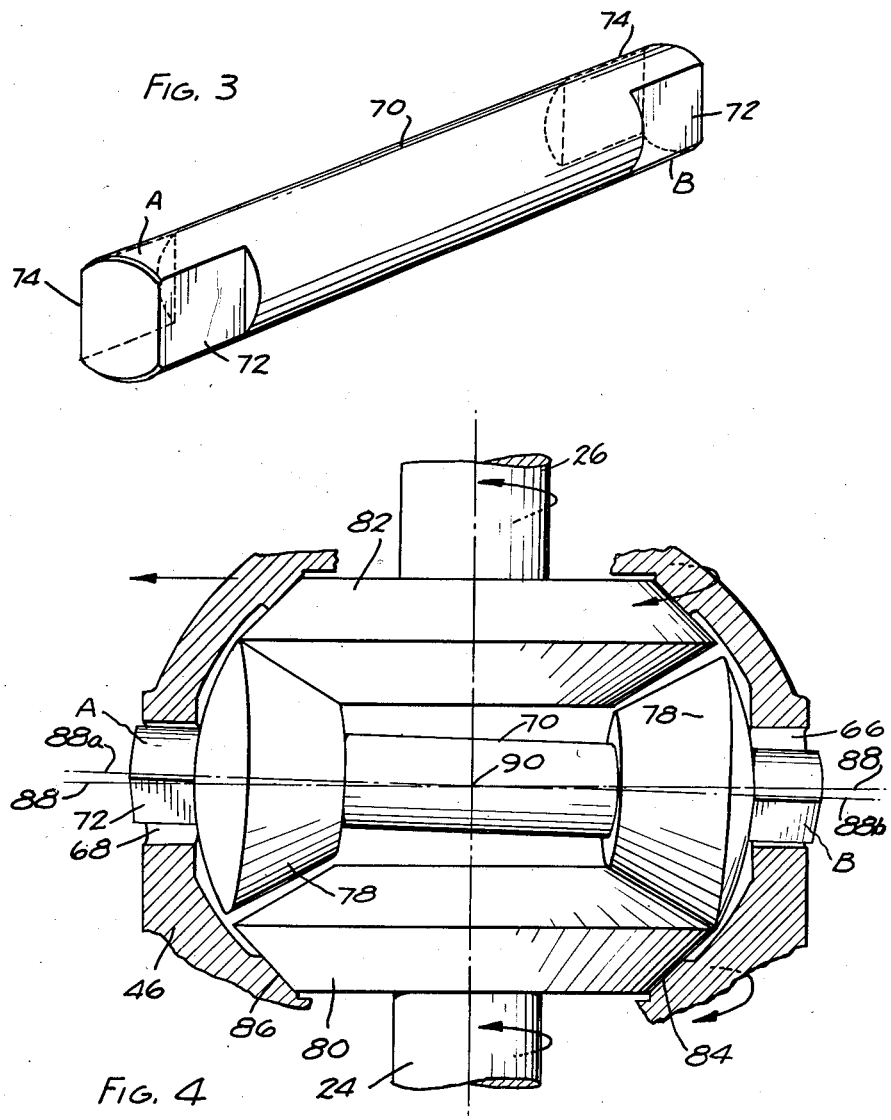

2,769,353

DIFFERENTIAL GEARING

Edward L. Nash, Ferndale, Mich., assignor to Studebaker-Packard Corporation, a corporation of Michigan Application July 12, 1954, Serial No. 442,587

5 Claims. (Cl. 74—711)

The present application relates to differential gearing for driving oppositely extending axle members and particularly relates to differential gearing having clutch members effective between the axle members to equalize the speeds of the latter when one axle becomes relatively unloaded and tends to overrun the other excessively.

Self-locking differentials for preventing the run away or overrun of one temporarily unloaded axle with respect to its companion axle when the latter remains loaded assume one known form wherein normally engaged side clutches in the differential are arranged to slip somewhat in operation but only to a degree within which the relative speeds of the axles hold some reasonably close proportions to one another; otherwise the side clutches are reaction thrust responsive to become more positively engaged to attempt to bring the axles directly to a common speed or else bring the axles individually to the rotating speed of the same third member. Interdentially engaging clutches, characterized by the fact that in operation they require only a small reaction thrust component for their actuation, have been tried, or at least proposed, under various circumstances in self-locking differential, but their harshness or abruptness of operation have been criticized. Friction engaging clutches have been used with greater success in differentially gear axles in some instances, but they have generally proved cumbersome and bulky in their actual physical embodiment due primarily to the conception that the desired reaction thrust for actuating them has been necessarily of a substantial magnitude and has been felt to be desirably transmitted in the direction of each axle either concentrically therewith if the thrust is undivided or else geometrically balanced about the axis of the axle when divided so as not to produce eccentric loadings thereon.

In the invented improvement according to the present application a self-locking differential which is perhaps better termed a reluctantly slipping clutched differential, is disclosed in which the slippable clutches are arranged to be actuated by off-center reaction thrust components through a mechanical path readily provided in a much simplified and compact differential structure.

It is therefore an object of the present invention to provide a simplified and compact differential structure which under the proper circumstances will produce a self-locking or safety differential action.

Another object in conjunction with the object defined in the preceding paragraph, is to provide a self-locking differential lending itself to readily realizable economies of manufacturing and in fact differing little in actual structural elements from presently commercially used unlockable differentials, the difference applying only in regard to slight but critical modifications of the main elements in order to provide the locking feature.

Another object of the invention is the provision of a differential gear axle mechanism having reaction thrust actuated slippable clutches for locking the differential and having cam induced eccentrically located loading means for physically actuating the clutches.

Another object of the invention is to provide a side-gear type differential mechanism having simplified parts of a minimum number including as main components, a single one-piece rotatable differential case, a single set of two gear-driving pinions, and only two sets of confronting clutch surfaces for the driven side gears. According to one feature of the invention the mere reaction of the two gear-driving pinions operates to apply thrust against and spread apart the side gears so as to cause the confronting clutch surfaces therefor to engage, whereas in analogous prior known systems in the field, more than two gear-driving pinions having been provided and in fact provided on the basis that they are considered necessary in these larger numbers in order to cause effective clutch engagement at both sides of the differential.

A further object of the invention is to provide a simplified two pinion clutch differential which offers a clutching effect irrespective of whether it is forwardly or reversely driven and which conforms to such a changing direction in its required operation without clicking or making other noises as the case may be in some known comparative structures.

Further features, objects and advantages will either be specifically pointed out or become apparent when for a better understanding of the invention, reference is made to the following written description taken in conjunction with the accompanying drawings in which:

Figure 1 is a plan view in section of an automotive rear-drive type differential embodying the principles of the present invention.

Figure 2 is a sectional showing along section lines 2—2 of Figure 1 as viewed axially along the pinion carrying pin shaft of the differential.

Figure 3 is a perspective view of the pin shaft of Figure 2 and;

Figure 4 is a diagrammatic operational view corresponding to Figure 1 but showing the pin shaft thereof in its tilted out-of-neutral position.

In the drawings a differential 10 is shown which is suited to use in a rear end drive automobile, among other uses. As arranged in such automobile, whose forward direction of vehicle motion may be assumed to correspond to the direction of an arrow indicated at 12, the differential 10 receives at its forward end a splined input shaft 14 which is appropriately connected to an engine powered reversible automotive transmission, not shown. The differential 10 is received in a cylindrically shaped stationary axle housing portion 16 commonly known as a banjo type housing from which a pair of tubular axle housings 18 and 20 extend along a common axis 22. Rotatably mounted within the tubular axle housings 18, 20, are a pair of left and right wheel connected rear axles 24, 26 which extend in opposite directions from one another.

A differential carrier is provided having a reduced tubular forward portion 28 in which the splined input shaft 14 is set in a span of bearings and having at the rear a pair of axially spaced apart bearing pedestals 30, 32. A carrier attaching flange 34 is provided which is bolted to the banjo housing portion 16 as by a set of screw fasteners not shown. The banjo housing 16 has a rear end opening through which a set of bearing caps 36, 38 protrude which complete the bearing structure of the respective pedestals 30, 32. A pressed steel cover 40 suitably secured by welding or by bolts, not shown, is permanently affixed to the rear end opening of the banjo housing 16 so as to close the same and seal off the bearing pedestals 36, 38 and associated structure from dust and other foreign matter. The bearing pedestal 30 and its cap 36 confine a set of tapered roller bearings 42 at one side of the differential 10 and the bearing pedestal 32 and its cap 38 confine another set of tapered roller thrust bearings 44 at the opposite side of the differential 10.

A differential case 46 of one piece construction is set to rotate in the resulting span of tapered roller bearing 42, 44 and for this purpose has a pair of opposite left and right hub portions 48, 50 of reduced diameter which form journals for the differential case 46 within the span of bearings 42, 44. The one piece differential case 46 incorporates a radial gear attaching flange portion 52 which rotates in its own plane and also a generally U-shaped or arched member integral therewith and having base portion 54 to which the right hub portion 50 is integrally affixed and having a pair of opposite leg portions 56, 58 joined directly to the flange portion 52. The radial flange portion 52 on the differential case has a hypoid gear 60 secured thereto by a set of bolts, not shown, which carries a set of curved hypoid gear teeth 62. The hypoid gear teeth 62 are arranged to be continuously enmeshed with a companion set of hypoid gear teeth formed on a pinion 64 which is integral with the previously splined input shaft 14. At corresponding points in the leg portions 56, 58 of the one piece differential case 46 so as to be diametrically opposite to one another and disposed in the same plane of elongation, a pair of pin receiving elongated slots 66 and 68 is provided and by reason of their plane of elongation being common to one another, the slots in the leg portions 56, 58 may be broached during the same operation in a single broaching fixture.

A pinion carrying pin shaft 70 is provided having a pair of opposite ends A and B received in the respective elongated slots 68, 66; each of the end portions A and B of the pin shaft 70 has a pair of flat portions 72, 74 formed at diametrically opposite positions in parallel planes therein such that the plane of each flat 72 or 74 is in the same plane as the flat 72 or 74 at the opposite end of the pin shaft 70. At its cylindrical mid-portion between the end portions A and B, the pin 70 receives a rectangularly shaped cylindrically hollowed axle shaft spacer 76 which is disposed between a pair of gear driving differential pinions 78 rotatable about the pin shaft 70. The pinions 78 are of customary beveled gear construction and mesh at each side of each pinion with a set of beveled side gears 80, 82 which are splined to and drive the respective left and right rear axles 24, 26. The side gears 80 and 82 have a pair of frusto formed portions such as at 84 which may be of frusto spherical construction but preferably are frusto conical. Each of the frusto conical surfaces 84 is frictionally engageable with a confronting companion frusto conical surface 86 formed in the interior of the one piece differential case 46. In the solid line position shown in Figure 1 the confronting friction engaging surfaces 84, 86 at each side of the differential case 46 only lightly engages one another, if at all, and in this position the pinion carrying pin 70 assumes a corresponding neutral position in slots 66, 68 at which its central axis 88 revolving about the mid-portion or mid-center thereof 90 defines a neutral plane of revolution 92, common to the pin 70, to the gear driving bevel pinions 78, and to the geometric center line of the diametrically opposed elongated slots 66, 68 in the differential case 46. The pin 70 is capable of being reaction thrust actuated by a force component tending to tilt or move the same out of neutral position in a diagonal direction about a geometric mid-center for the pin and pinions 70, 78 which happens to coincide with indicated point 90 previously described.

For a better understanding of the tilting action of the pin shaft 70 which in its operation tends to separate the side gears 80, 82 from the axle shaft spacer 76 and move them in a direction toward a set of bronze thrust washers 94, reference may be had to Figure 4 of the drawings showing the clutching action of the differential by means of an exaggerated diagram for the purpose of a ready understanding of the operation. The pin shaft 70 tilts about its geometric mid-center 90 such that the pin end portions A and B move out of the neutral plane of revolution 92 and the central axis 88 of the revolving pin 70 assumes a dotted line position 88a at the end portion A of the pin 70 and assumes a dotted line position 88b at the end portion B of the pin 70. The end portions A and B themselves slide lengthwise in the slots 66, 68 in which they are received in an arcuate path of rectilinear travel about the mid-center 90 as a center. At all times, the beveled side gears 80, 82 have bevel gear teeth enmeshed with sets of companion bevel teeth on the respective gear driving pinions 78, and when the pin 70 and the beveled gear 78 assume their out-of-neutral tilted position the engaging beveled gear teeth tend to shift their points or lines of contact so as to impart equal and opposite separating forces to the axle driving side gears 80, 82. Accordingly the confronting friction engaging surfaces 84, 86 between each side gear and the differential case 46 are caused to engage one another positively and attempt to bring each axle 24, 26 and their attached side gears to a speed in common with the driving differential case 46. The reaction thrust effective for such spreading movement of mutual separation of the side gears 80, 82 is imparted from the camming effect of the walls of the slots 66, 68 engageable with the pin end portions A and B.

Reference may be had particularly to Figure 2 for the described camming operation wherein the direction of forward vehicle motion is indicated by the arrow 12 and wherein the rotation of the differential components is indicated by appropriate arrows. Thus, in the forward direction of motion of the automobile the lower cam slot surface 66 presses against the adjacent flat 72 on the end portion A of the pin shaft and through a wedging angle indicated at C tends to drive the pin not only in the direction of rotation indicated for the hypoid gear 60 but also provides a reaction thrust component tending to move the end portion A to the right as viewed in Figure 2 so as to tilt the pin about its mid-center 90, Figures 1 and 4.

Simultaneously the end portion B, Figure 4, is being cammed by the cam slot surface 60 engaging the flat 74 thereof so as to tilt the axis 88 of the pin to the position 88b adjacent the end portion B. Conversely, for reverse drive of the differential shown in Figure 2 the end portions A and B tilt in the opposite direction from the solid line position shown in Figure 4 but still act to the side gears 80, 82 in an effort to clutch up the differential. The distinction between the effects of forward and reverse drive will be appreciated from the view of Figure 4 wherein it can be seen that the pinion 78 at the right hand side of the drawing is relatively farther from the viewer than is the pinion 78 at the left hand side of Figure 4 and that the former pinion 78 tends to load the left hand side gear 80 of the differential that is (the bottom side gear) eccentrically and on the right hand face thereof. Similarly, the left hand side pinion 78 tends to load the right hand side gear 82 (that is, the upper side gear) at an eccentric position on the left face of the latter gear. Conversely for reverse drive the left hand gear driving pinion 78 tends to load the lower side gear 80 for the left axle 24 eccentrically thereof at the left hand side and the gear driving pinion 78 at the right tends to load the upper side gear 82 eccentrically thereof at the right hand side, and the resulting wedging action in the latter case as seen at Figure 2 conforms to the wedging angle D there shown. It is, of course, understood that the engagement of the hypoid gear teeth 62 between the pinion and gear 64, 60 forms a reversible drive whereby the differential case 46 readily reverses its rotation when the splined input shaft 14 reverses its own direction of rotation.

The following is given as an example of the materials which may be used in the construction of the differential 10 described: Shaft pin 70 and flats thereon: Case hardened steel; one piece differential case 46: preferably cast of malleable iron but may be case hardened steel; material of cam slot surfaces 68, 66, same as the one piece differential case 46; material of side gears 80, 82 and clutch surfaces 86; case hardened steel.

The differential 10 is designed to be filled with commercial hypoid lubricant in conventional fashion and based on the dry and lubricated coefficients of friction of the respective flats 72, 74 and cam slot surfaces 66, 68, the angles of repose corresponding to the wedging angles C, D are approximately 8° and 4° respectively. The angles of cam wedge at C and D are preferably equal to one another and desirably exceed the given angles of repose by at least 30°, and desirably the wedging angles C and D fall within the range of 35 to 45 degrees for example. Cam wedging angles considerably in excess of these examples of wedging angles tend to exert a too great a clutch engaging component and keep the clutches engaged at all times so as to interfere with the cornering, that is turning about the corner, of the vehicle at which time the axles 22, 24 are required to have relative rotation with respect to one another.

In operation, the reluctant slipping clutch differential 10 described is of benefit as a safety device to a vehicle to which it is fitted when the vehicle is proceeding in a substantially straight line along a dry road bed having a muddy shoulder and becomes particularly effective to produce directional stability of the vehicle whenever the axle driven wheel at the end of the right axle 26 falls off into the mud of the shoulder. The differential 10 also provides an invaluable convenience in the matter of breaking away the vehicle from a standstill when one rear wheel is on ice and the other wheel is on solid ground, that is fully loaded so as to tend to remain stationary. In such instance, the thrust reaction for driving the ice supported unloaded wheel an axle is sufficient to cause the pinion shaft to be cammed into its tilted position according to Figure 4 and to bring about engagement between the frusto conical friction engaged surfaces 84, 86 and each side of the differential 10. The result is that the unloaded but rotating axle tends to be brought down in speed to the speed of the driving differential case 46 and loaded stationary axle tends to be set in motion and brought up to the speed of the rotating driving differential case 46. The latter loaded wheel, having traction, then causes the vehicle to be set in motion to move the same to an advanced position at which both wheels have traction and both can cooperate to move the vehicle ahead in the desired fashion of load sharing. The selection of the magnitude of the cam angles C and D is particularly important in that if it is too low in magnitude the proper clutch action will not occur between the confronting clutch surfaces 84, 86 and if too large, the resulting wedging will tend to clutch up the differential for all purposes and interfere with the proper cornering action of the oppositely extending wheel connected axles 24, 26.

The selection of the proper thickness of the side thrust washers 94 is also important in that if one or both of the washers 94 is too thin, too much play may tend to develop in the axle and if too thick, the washers 94 may tend to keep the frictionally engaging clutch surfaces shimmed apart and prevent their satisfactory cooperation.

The length of elongation of the cam slot guide forming means 66, 68 is important in order to prevent the pin end portions A and B from undesirably bottoming therewithin in the extreme ends of their substantially rectangular path of travel from neutral position out of their plane of rotation 92, and the opposite cam sides of the slots are accurately broached parallel to one another so as to be continually engaged with the companion flats 72 and 74 on the end portions of the pin 70.

It can be readily appreciated that through the mere minor modification of a differential of conventional design, such differential may be converted into the self-locking type here described and the minor modification merely involves the provision for the desired action of limited movement between the cam and flat surfaces of the pin 70 and the case 46 and between the frictionally engaged clutch surfaces 84, 86 of the side gears 80, 82 and the adjacent drive case 46.

As herein disclosed, the invention is shown embodied in a hypoid type automobile differential; it is evident that in differentials of other types the features of novelty presented in this application may be equally advantageously employed. So also the drawing shows a two pinion clutch differential wherein the clutches are eccentrically loaded and actuated as a result of the tilting of the pin 70 and the pinions 78 but self-evidently the eccentric clutch loading characteristic is applicable to four pinion differentials which happen to necessitate a more complex multiple piece differential case rather than the single piece construction shown herein at 46. The cam slot guide forming means 66, 68 extend diagonally on both sides of the neutral position of the pin ends A, B in order to afford cammed clutch locking for both forward and reverse drive of the differential corresponding to forward and reverse drive of the automobile, but indeed, it is not essential that the slots extend beyond more than one side of the neutral position of the pin and the camming action for instance in reverse may be entirely dispensed with if not desired.

Variations within the spirit and scope of the invention described are equally comprehended by the foregoing description.

What is claimed is:

1. In a differential mechanism having a power rotable differential case containing two axle connected relatively rotatable side gears and an inter-connecting set of pin carried pinions disposed therebetween and revolvable with the case, the combination comprising opposite end portions of said pinion carrying pin each having a pair of flats formed in parallel planes in the outer surface thereof and each coinciding with the plane of the corresponding flat on the other end portion, cam slot guide forming means in the differential case receiving the opposite end portions of the pin so as to continually engage the flats thereof and being diagonally elongated for causing and accommodating limited load impressed tilting travel of the pin and pinions diagonally out of their neutral plane of revolution and about their common geometric mid-center in a direction tending to spread apart the side gears, and means forming separate pairs of friction engaging surfaces between the differential case and each of said side gears and engageable to establish a reluctant slip drive from the differential case to the individual axles when the pin and pinions are load impressed into either of opposite directions from their neutral plane of revolution.

2. In differential mechanism having a rotatable one-piece case containing two axle connected concentrically rotatable side gears and an inter-connecting set of pin carried pinions disposed therebetween and revolvable with the case, the combination comprising opposite end portions of said pinion carried pin each having a pair of flats formed in parallel planes in the outer surface thereof and each coinciding with the plane of the corresponding flats on the other end portion, cam slot means formed in diametrically opposite portions of the one-piece case and being elongated in a common plane diagonally related to the plane of rotation of the same for slidably receiving the opposite end portions of the pin in continuous engagement with the flats of the latter so as to cause and accommodate limited load-impressed travel of the pin and pinions about the common axis of rotation of the case and the side gears in a direction diagonally out of the neutral plane of revolution of the pin and pinions so as to tend to spread apart the side gears, and means forming separate pairs of friction engaging surfaces between the differential case and each of said side gears and engageable to establish a reluctant slip drive from the differential case to the axles when the pin and pinions are load impressed into either of opposite directions from their aforesaid neutral plane of revolution.

3. In differential mechanism having a driving differential case containing two relatively rotatable driven side gears and an inter-connecting set of pin carried pinions disposed therebetween and revolvable with the case, the combination comprising opposite end portions of said pinion carrying pin each having a pair of flats formed in parallel planes in the external surface thereof and each coinciding with the plane of the corresponding flat on the other end portion, cam slot guide forming means in the differential case receiving the opposite end portions of the pin and being elongated and slidably receiving said flats for accommodating limited load-impressed travel of the pin and pinions diagonally out of the neutral plane of revolution about their common geometric mid-center in a direction tending to spread apart the side gears, said diagonal direction of limited travel of the pin end portions in said elongated slot guide forming means forming a wedging angle at least 30° greater than the approximate angle of repose of the material of the flats and of the cam slot guide means with respect to one another, and means forming separate pairs of friction engaging clutch surfaces between the differential case and each of said side gears and engageable to establish at least substantially conjoint rotation between the axles and differential case when the pin and pinions are load impressed in either of opposite directions from their aforesaid neutral plane of revolution.

4. In differential mechanism having a rotatable differential driving case and containing two relatively rotatable driven side gears and an inter-connecting set of pin carried pinions disposed therebetween and revolvable with the case, the combination comprising opposite end portions of said pinion carrying pin each having a pair of spaced apart flats formed diametrically opposite to one another in the external surfaces thereof and each coinciding with the plane of the corresponding flat on the other end portion, cam slot guide forming means in the differential case receiving the opposite end portions of the pin and being elongated for slidably engaging the flats to accommodate limited load impressed travel of the pin and pinions diagonally out of their neutral plane of revolution about their common geometric mid-center in a direction tending to spread apart the side gears, said diagonal direction of limited travel of the pin end portions in said elongated slot guide forming means producing a wedging angle of approximately 35°–45°, and means forming separate pairs of friction engaging clutch surfaces between the differential case and each of said side gears and engageable to establish at least substantially conjoint rotation between the axles and differential case when the pin and pinions are load impressed in either of opposite directions from their neutral plane of revolution.

5. In a differential mechanism having a driving differential case member containing relatively rotatable driven side gears and two inter-connecting pin carried pinions disposed therebetween and revolvably driven by and with the case member, said pinion carrying pin member being capable of limited tilting movement about its mid-center with respect to the case in a direction out of the neutral plane of revolution of the pin and pinions, the combination comprising means forming separate pairs of frustoconical friction engaging surfaces between the case member and each of the side gears and engageable when the side gears are subjected to motion of mutual separation for establishing a reluctant slip drive from the case to the side gears, and means forming continually engaged flat surfaces between the case member and each of the opposite ends of the pinion carrying pin member effective to wedge the latter ends in opposite directions with respect to the side gears for mutually separating the side gears and establishing the reluctant slip drive aforesaid, said means including diametrically opposite flat cam surfaces on one member limiting the companion flat surfaces on the other member to a single path of relative arcuate movement from the neutral plane of revolution of the pin and pinions as above described.

References Cited in the file of this patent

UNITED STATES PATENTS

| | | |
|---|---|---|
| 1,683,938 | Wildhaber | Sept. 11, 1928 |
| 1,791,198 | Focher | Feb. 3, 1931 |
| 2,064,152 | Conboy | Dec. 15, 1936 |
| 2,305,092 | Lawrence | Dec. 15, 1942 |
| 2,510,996 | Morgan | June 13, 1950 |
| 2,569,533 | Morgan | Oct. 2, 1951 |

FOREIGN PATENTS

| | | |
|---|---|---|
| 736,780 | Germany | June 28, 1943 |
| 886,860 | France | July 19, 1943 |